(12) United States Patent  (10) Patent No.: US 7,654,755 B2
Orf et al.  (45) Date of Patent: Feb. 2, 2010

(54) FOLDING HINGE

(75) Inventors: H. Robert Orf, Simi Valley, CA (US); Jerry Holway, Exton, PA (US)

(73) Assignee: The Tiffen Company LLC, Hauppauge, NY (US)

( * ) Notice: Subject to any disclaimer, the term of this patent is extended or adjusted under 35 U.S.C. 154(b) by 664 days.

(21) Appl. No.: 11/401,783

(22) Filed: Apr. 11, 2006

(65) Prior Publication Data

US 2006/0231700 A1 Oct. 19, 2006

Related U.S. Application Data

(60) Provisional application No. 60/670,590, filed on Apr. 12, 2005.

(51) Int. Cl.
*G03B 17/00* (2006.01)
*F16M 11/04* (2006.01)
*H04N 5/225* (2006.01)

(52) U.S. Cl. .................. 396/421; 396/422; 396/428; 248/187.1; 348/373; 348/375; 352/243

(58) Field of Classification Search ............... 396/420, 396/419, 421–428; 248/187.1; 348/373, 348/375; 352/197, 243
See application file for complete search history.

(56) References Cited

U.S. PATENT DOCUMENTS 5,933,191 A * 8/1999 Ariga et al. ................. 348/373
2003/0057339 A1 3/2003 Watkins
2004/0118985 A1 6/2004 Omps

OTHER PUBLICATIONS

PCT International Search Report for PCT Patent Application No. PCT/US06/13432, dated Aug. 31, 2007.
Written Opinion dated Jun. 10, 2007 for PCT/US2006/013432.

* cited by examiner

*Primary Examiner*—Rochelle-Ann J Blackman
(74) *Attorney, Agent, or Firm*—Schnader Harrison Segal & Lewis LLP

(57) ABSTRACT

A folding hinge for camera stabilization equipment. The hinge includes support connectors having apertures through which cables may be passed to connect a camera with various auxiliary components. An indexing guide pivotally attaches the support connectors so the camera stabilization system can be folded and unfolded with little or no disruption of the cables pr system balance. Locking mechanisms secure the hinges to provide a desired angular relationship between support members connected by the hinge.

13 Claims, 12 Drawing Sheets

FOLDING HINGE

This application is based on, and claims priority to, provisional application Ser. No. 60/670,590, having a filing date of Apr. 12, 2005 and entitled Folding Post hinge.

FIELD OF THE INVENTION

Embodiments of the invention relate to camera support equipment, and more particularly to hinges connecting components thereof.

BACKGROUND OF THE INVENTION

FIG. 1 depicts a conventional basic body mounted or hand held camera support and stabilization system 100. It includes a top stage 102 for camera mounting, post 104 and gimbal mechanism 106 for support of a camera and stabilizer system about a common pivot point, a monitor 108 for viewing the camera's image, and a lower support (sled) 110 that interconnects the post, a battery system 112, and miscellaneous electronic systems. Battery power must be supplied to the camera, and the viewer must be functionally connected to the camera, so the image captured by the camera can be seen. As is apparent from FIG. 1, the camera is displaced from the viewer and the battery, and therefore, wires or cables must extend between the camera and these auxiliary components. (The term "cable" as used herein will include any flexible component that can functionally link cameras to auxiliary components such as viewers and batteries.) Typically, to accomplish this connect coaxial cable and stranded copper cables are run through connectors, or via hard wiring, from the lower sled portion 110, up through the post 104, to the top stage 102. Within the top stage section, power and video cables are then typically broken out to external connectors and then connected to the camera. Within this structure the preferred method of running the cables to the top stage section is within the post itself. Doing this helps to protect the cables from damage and also allows for unimpeded operation of the camera stabilization system without concern for having the operator or other equipment being entangled in the cables. The common approach in connecting the post cables to the lower sled portion 110 is either via a hard wired connection through a rigidly attached post or via an interconnect connector attached to a removable post. If a hard wired/rigid post method is employed, the camera stabilization type system is limited as to how compact it can become for storage and transport. When employing the removable post method, the cost of the assembly is increased because of the addition of connectors, and reliability of electrical or optical connections between post and sled is decreased.

Compacting of the camera stabilization system is desired in order to reduce the volumetric space required for storage and transport. Decreasing this size as much as possible allows users of the system to transport the device at a lower cost, and to have it fit more readily in compact spaces such as in cars. In effect, the system is made more portable. In having the ability to compact the system, the durability and reliability of the camera stabilization device must be maintained.

Currently there are a number of schemes to connect the post mechanism to the main lower sled body. They include, for example, mechanically rigid, non-removable or separable post mechanisms with hard wired electrical/fiber optic connections disposed internally within the post and sled. Also used are mechanically removable post mechanisms with connectorized electrical/fiber optic connectors internal to the post and sled. Another mechanically rigid, non-removable or separable post mechanism has hard wired electrical/fiber optic connections external to the post and sled. An external mechanism may also incorporate connectorized electrical/fiber optic connectors.

SUMMARY OF THE INVENTION

Embodiments of the invention provide a folding hinge for camera stabilization equipment. The hinge includes support connectors having apertures through which cables may be passed to connect a camera with various auxiliary components. An indexing guide pivotally attaches the support connectors so the camera stabilization system can be folded and unfolded with little or no disruption of the cables or system balance. Locking mechanisms secure the hinges to provide a desired angular relationship between support members connected by the hinge.

The invention further includes camera support systems using embodiments of the folding hinge and a method for of connecting camera equipment in such support systems.

DESCRIPTION OF THE DRAWINGS

The invention is best understood from the following detailed description when read with the accompanying drawings.

DETAILED DESCRIPTION OF THE INVENTION

Figure 1:
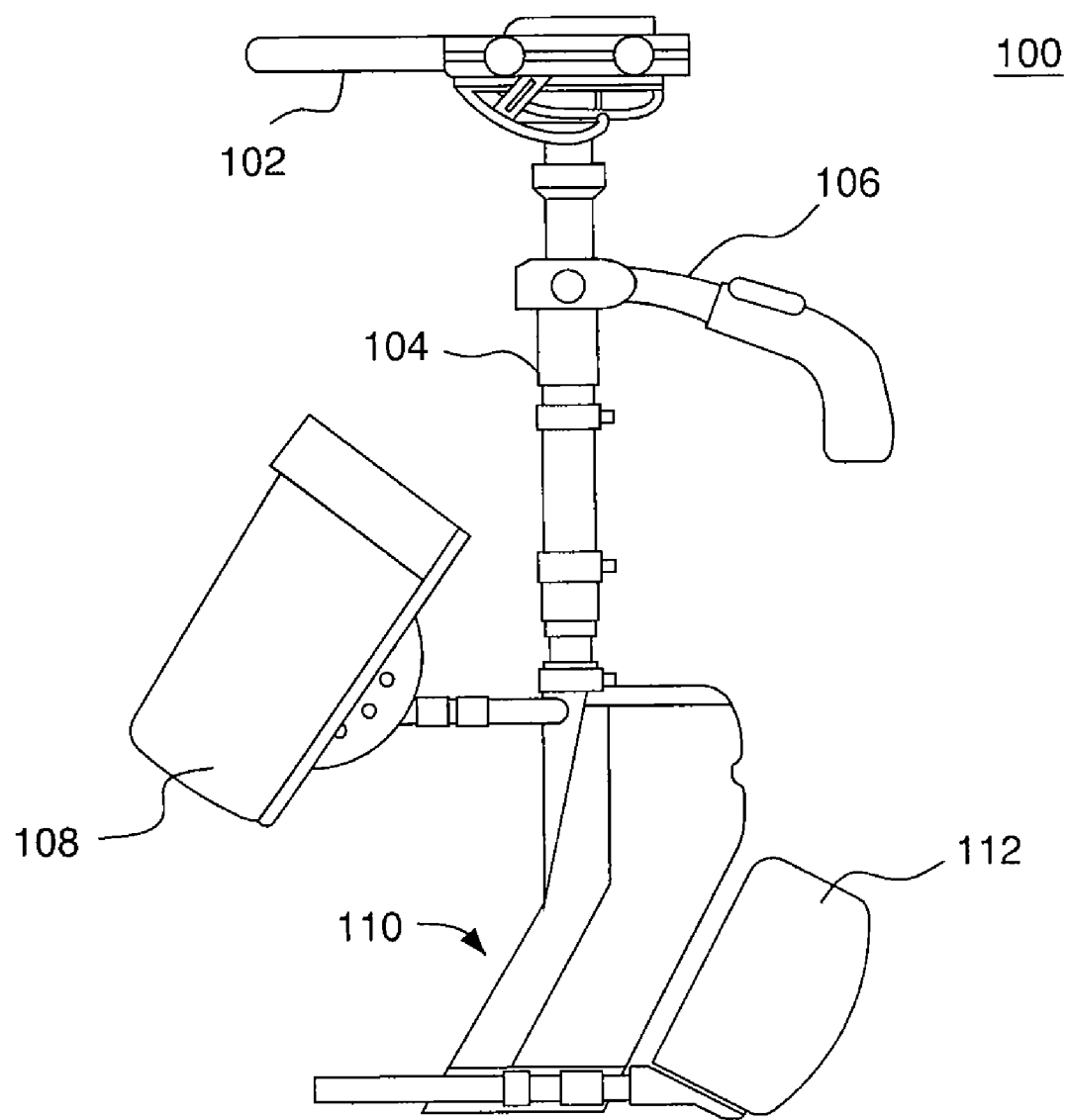
FIG. 1 depicts a prior art camera stabilizing system in which illustrative embodiments of the invention can be used.

In addition to allowing increased portability and reliability, the implementation of a hinged post mechanism may also improve the ability to achieve balance in the camera stabilization system. By introducing a common pivot point to the sled/post interface junction, and introducing a horizontally positionable monitor and battery support member, the major counterbalance components (battery and monitor) can be readily positioned to help achieve system balance.

Advantageously, embodiments of the inventive folding post hinge mechanism may provide greater electrical connection reliability due to the elimination of 2+ solder type electrical connections per wire in comparison to the removable post method. Connection reliability for optical fiber type connections may also be improved in comparison to the removable post method due to elimination of interconnect connectors. A rigid connection mechanism eliminates or reduces the possibility of cable/wire damage due to twist or abrasion as would happen for non-mechanically restrained post/sled interconnects. The ability to conceal and protect the cable path from post to sled body has thus far not been accomplished with the conventional technology.

Additionally, contact impedance may be reduced or eliminated, in comparison to the removable post method. Furthermore, the possibility of contact damage or contact damage through misalignment, or exposure to foreign matter or moisture may be reduced or eliminated in comparison to the removable post method.

Cost may also be reduced for certain embodiments of the invention due to the elimination of fiber optic and/or electrical connectors in comparison to the removable post method. Cost reductions may also be generated because there will be a reduction in labor that is required to construct the interconnect assembly in comparison to the removable post method.

Embodiments of the invention allow the post mechanism to fold easily for compact storage and transport in comparison to the fixed post method. Approximately 31% in space savings have been achieved using particular configurations of the invention. Compacting of the sled mechanism can be convenient and, in exemplary embodiments, performed without the use of tools.

A variation on the configuration will allow another way to balance the camera stabilization system by rigidly locking the post/sled interconnection point at various angles, and having the monitor and battery, or other equipment, counter balance weights balance about that common point.

Embodiments of the folding hinge can be placed at various intersections of components of a camera stabilizing system to provide a protected avenue through which cables can be passed through and further to allow the equipment to be folded or compacted without having to entirely disassemble the system.

FIGS. 2A-E depicts a folding hinge mechanism 200 according to an illustrative embodiment of the invention. A first support connector 202, having one or more apertures 204 therethrough is provided. Cable 206 is positioned to extend through aperture 204. A second support connector 208 is positioned so cable 206 can extend through it aperture(s) 210. An indexing guide 212 is positioned between first support connector 202 and second support connector 208. Indexing guide 212 has a first end 214 connected to first support connector 202 and a second end 216 connected to second support connector 208. Indexing guide 212 pivotally connects first support connector 202 to second support connector 208. Illustrative indexing guide 212 has two slotted sections 220 and 222 that allow first and second support connectors 202 and 208 to pivot with respect to each other and to slide apart from one another without totally separating. Slotted section 222 can slide into first support connector 202. Various pivoting mechanisms can be used provided they are compatible with the support connectors and allow one or more cables to pass through support connectors 202, 208. Indexing guide 212 may maintain a twist free, restrained movement of the mechanism to help prevent cable or harness damage.

Figure 2A:
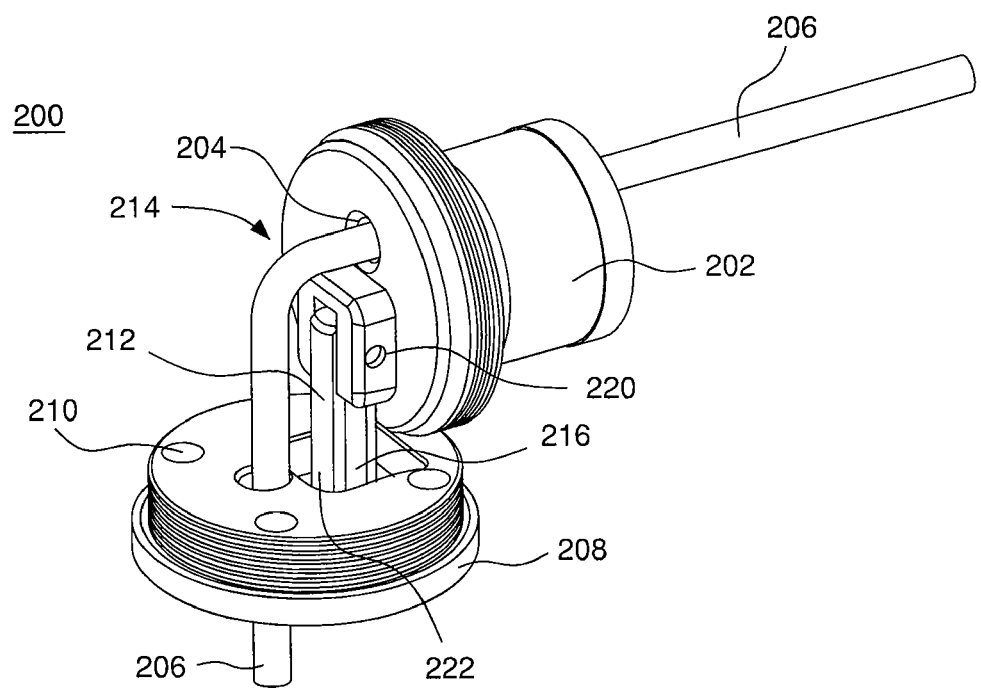
FIGS. 2A-E depict a folding hinge mechanism in various positions according to an illustrative embodiment of the invention.
Figure 2B:
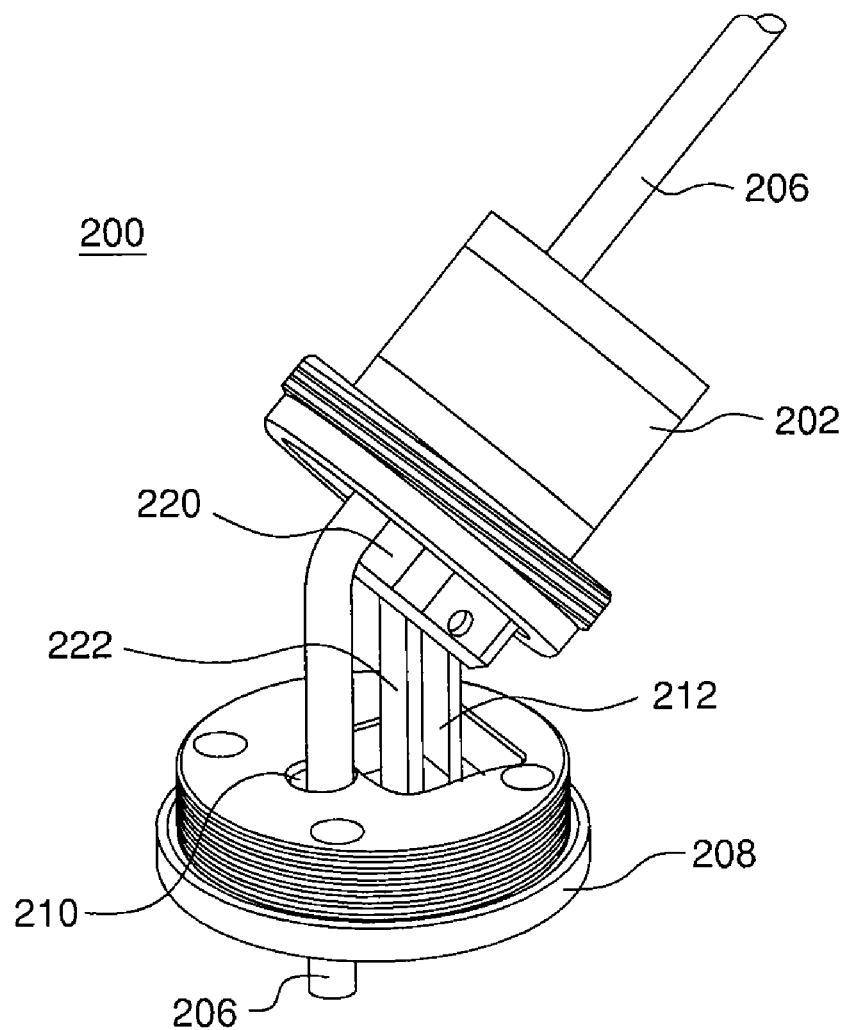
Figure 2C:
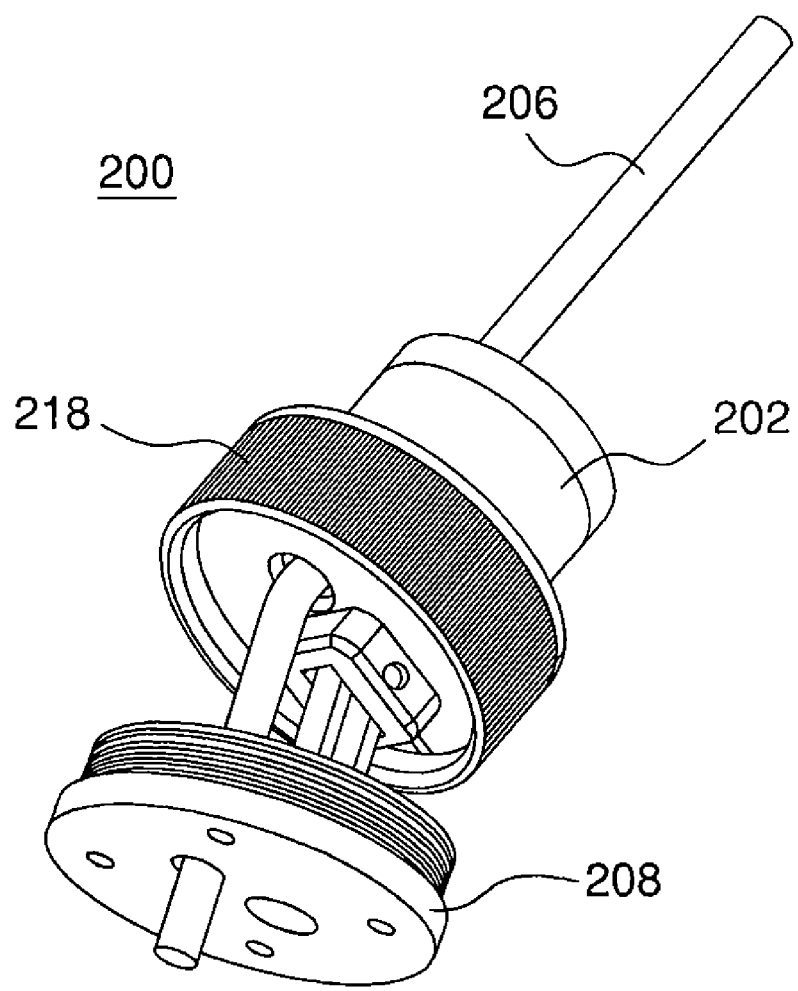
Figure 2D:
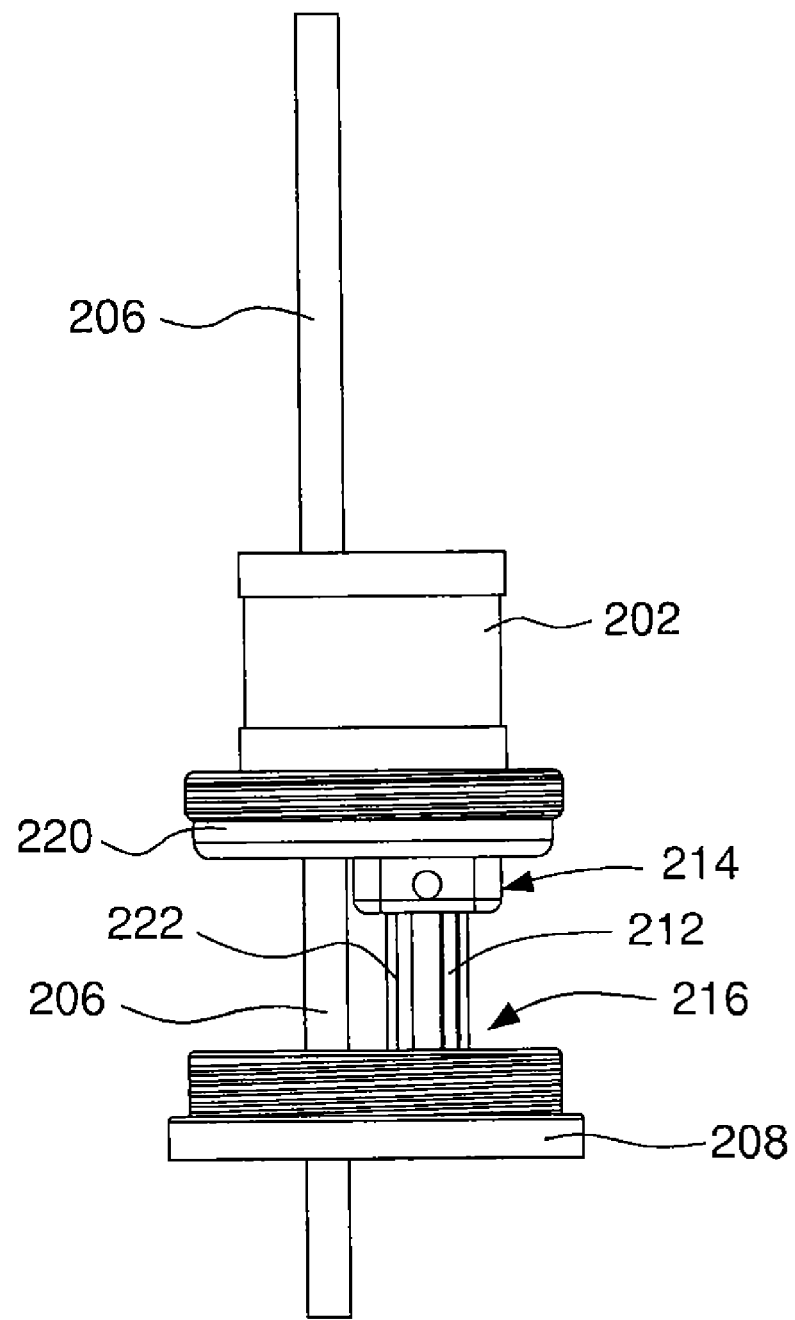
Figure 2E:
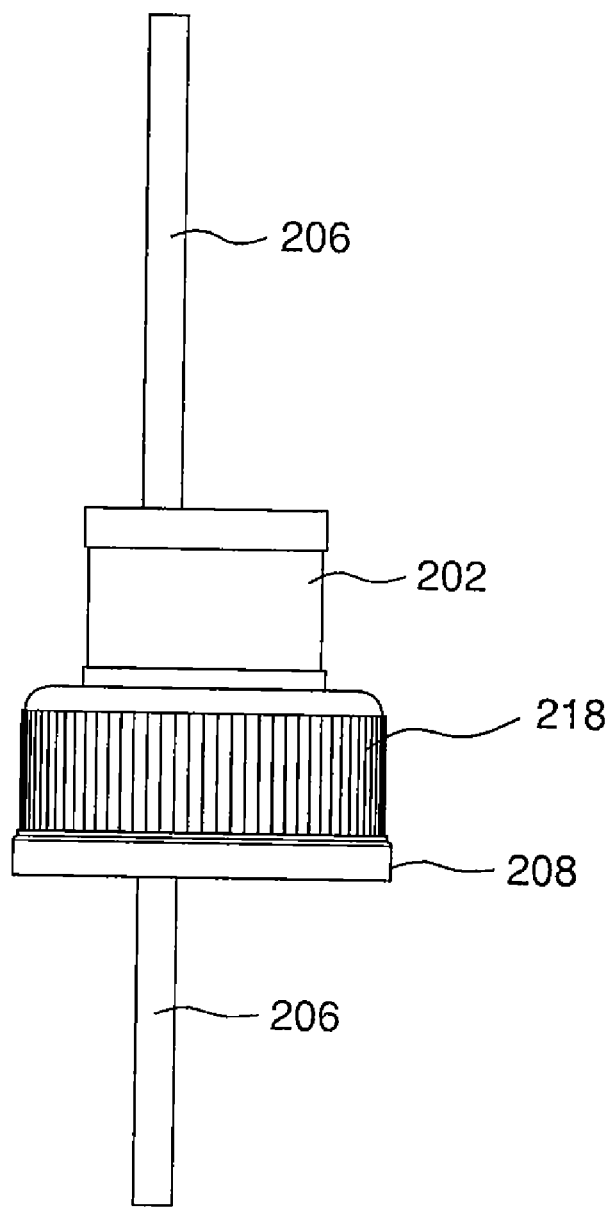

A locking collar 218 is releasably attached to first support connector 202 and second support connector 208 and alignable with the support connectors to allow the one or more flexible components to pass through locking collar 218. Locking collar 218 can be secured to first and second support connectors 202, 208 by, for example, threaded surface on both locking collar 218 and support connectors 202, 208. Locking collar 218 may also snap into place, for example by a detent mechanism. Use of a locking collar may dampen vibrations and movement typically occurring at such joints. In the embodiments depicted in FIGS. 2A-E, indexing guide 212 is disposed within locking collar 218 when the locking collar is attached to both the first support connector 202 and the second support connector 208. FIG. 2D depicts folding hinge 200 in a linear position without locking collar 218. FIG. 2E depicts folding hinge 200 in a linear position with locking collar 218 in place to keep hinge 200 from opening, i.e. pivoting.

Figure 3A:
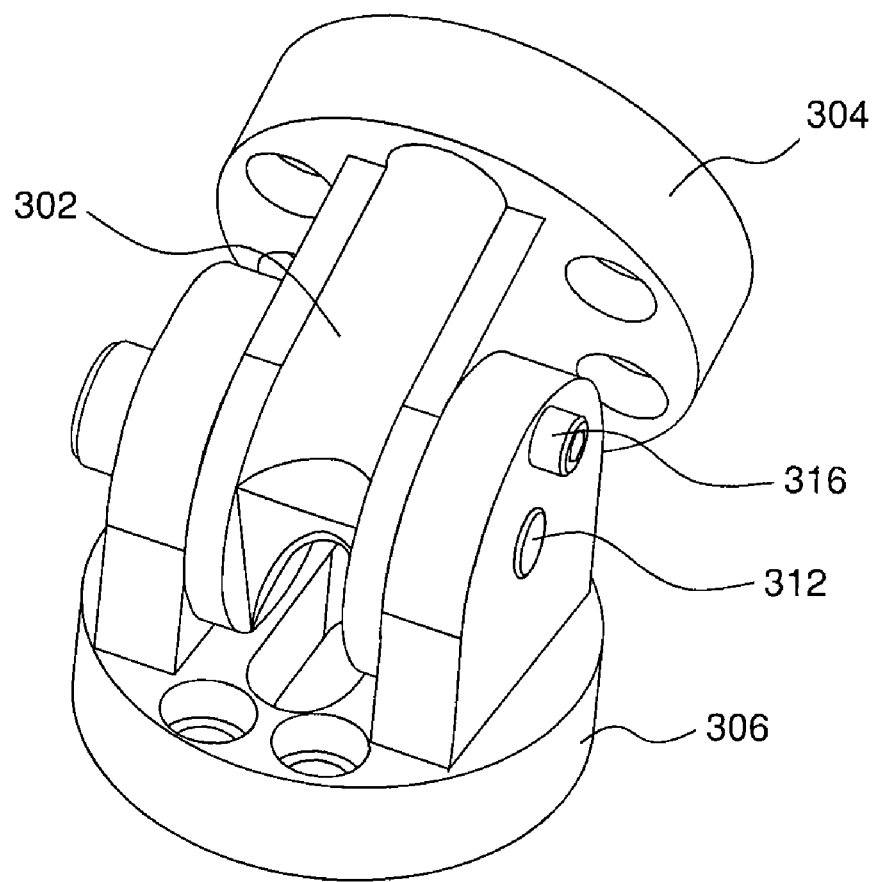
FIG. 3A-B show a folding hinge having an indexed stop position according to an illustrative embodiment of the invention.
Figure 3B:
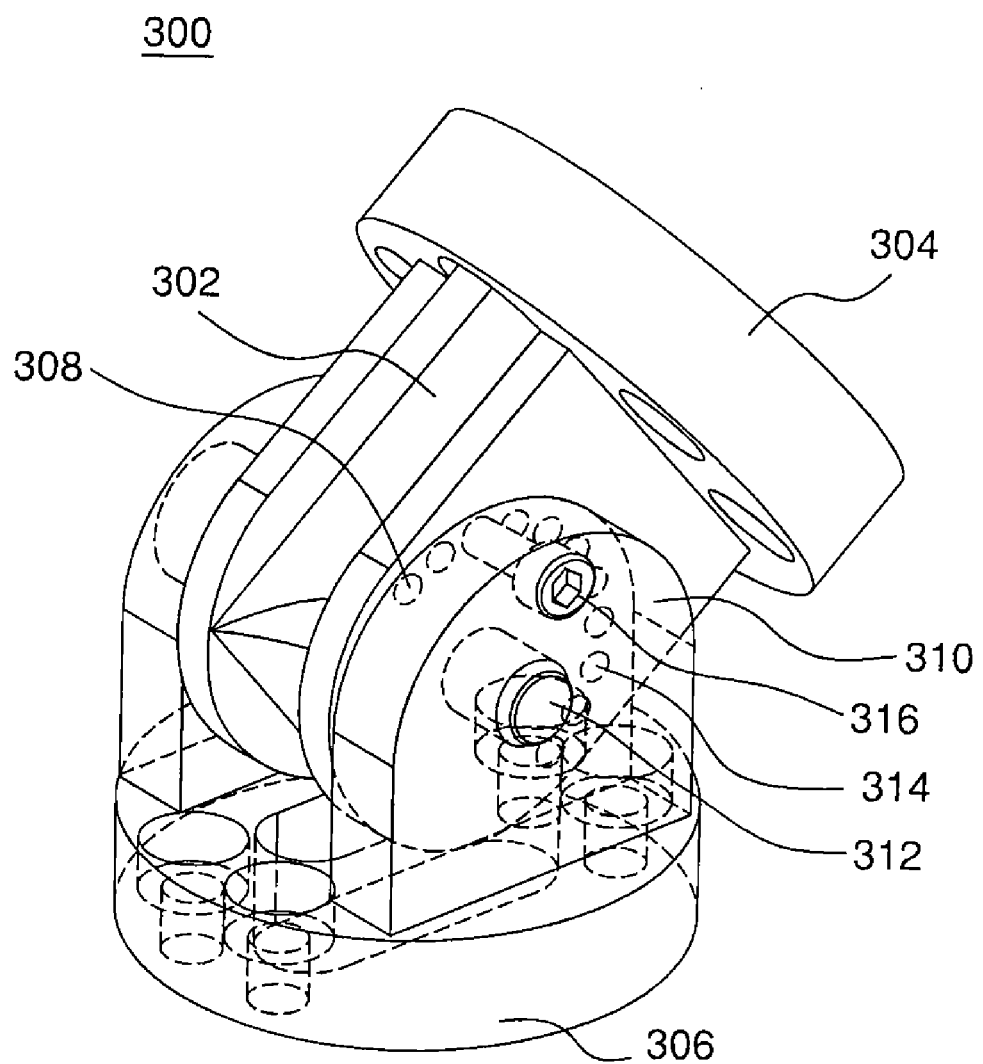

The embodiments shown in FIGS. 2A-E provide a linear support once the hinge is locked in place. It is sometimes desirable to maintain two support members at an angle with respect to one another. FIGS. 3A-B depict illustrative embodiments of a folding hinge 300 having an index locking mechanism to lock an index guide 302 in position with respect to a first support connector 304 and a second support connector 306. Folding hinge 300 has two or more indexed stop positions created by various openings in the locking components. FIGS. 3A-B show a first pivot locking component 310 incorporated into indexing guide 302 and having one or more lateral openings 308 therethrough. A second pivot locking component 312 is rigidly attached to one of the first or second support connectors 304, 306 and has one or more openings 314 therethrough. At least one of the one or more first pivot locking component lateral openings 308 is alignable with at least one of the one or more second pivot locking component openings 314. Once aligned, a locking pin or stop component 316 can be inserted through a lateral opening 308 and an aligned opening 314, thereby securing the index guide in place so support components 304, 306 are at a desirable angle to one another.

Figure 4:
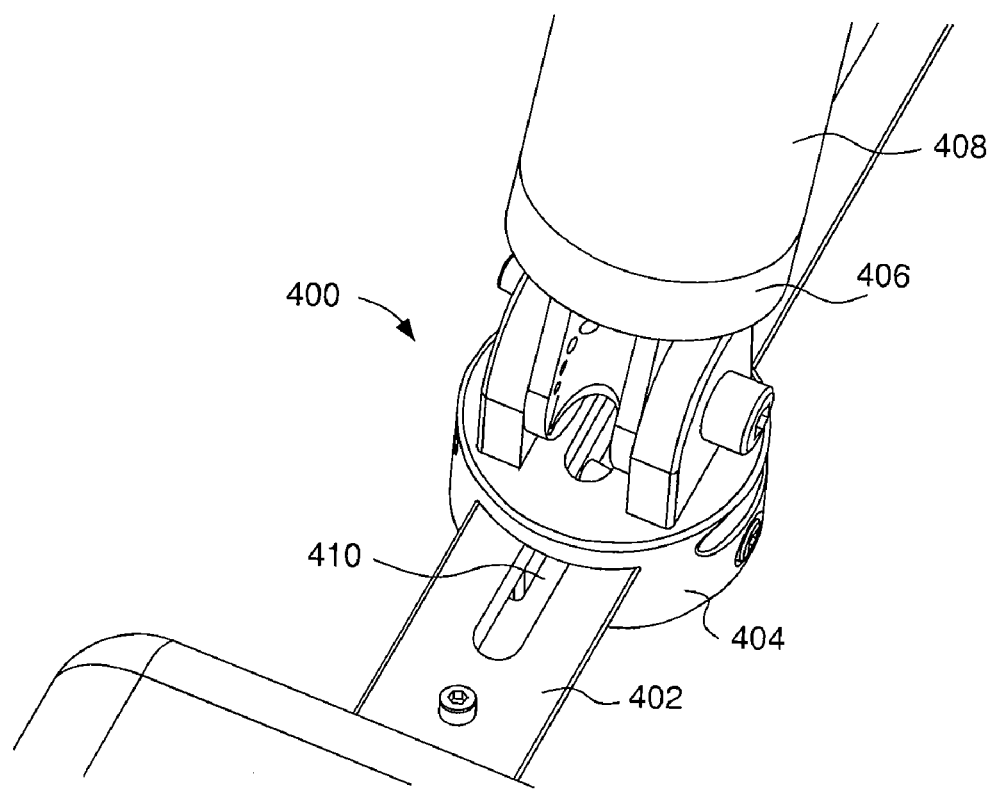
FIG. 4 depicts a support member slidably attached to a folding hinge according to an illustrative embodiment of the invention.
Figure 5A:
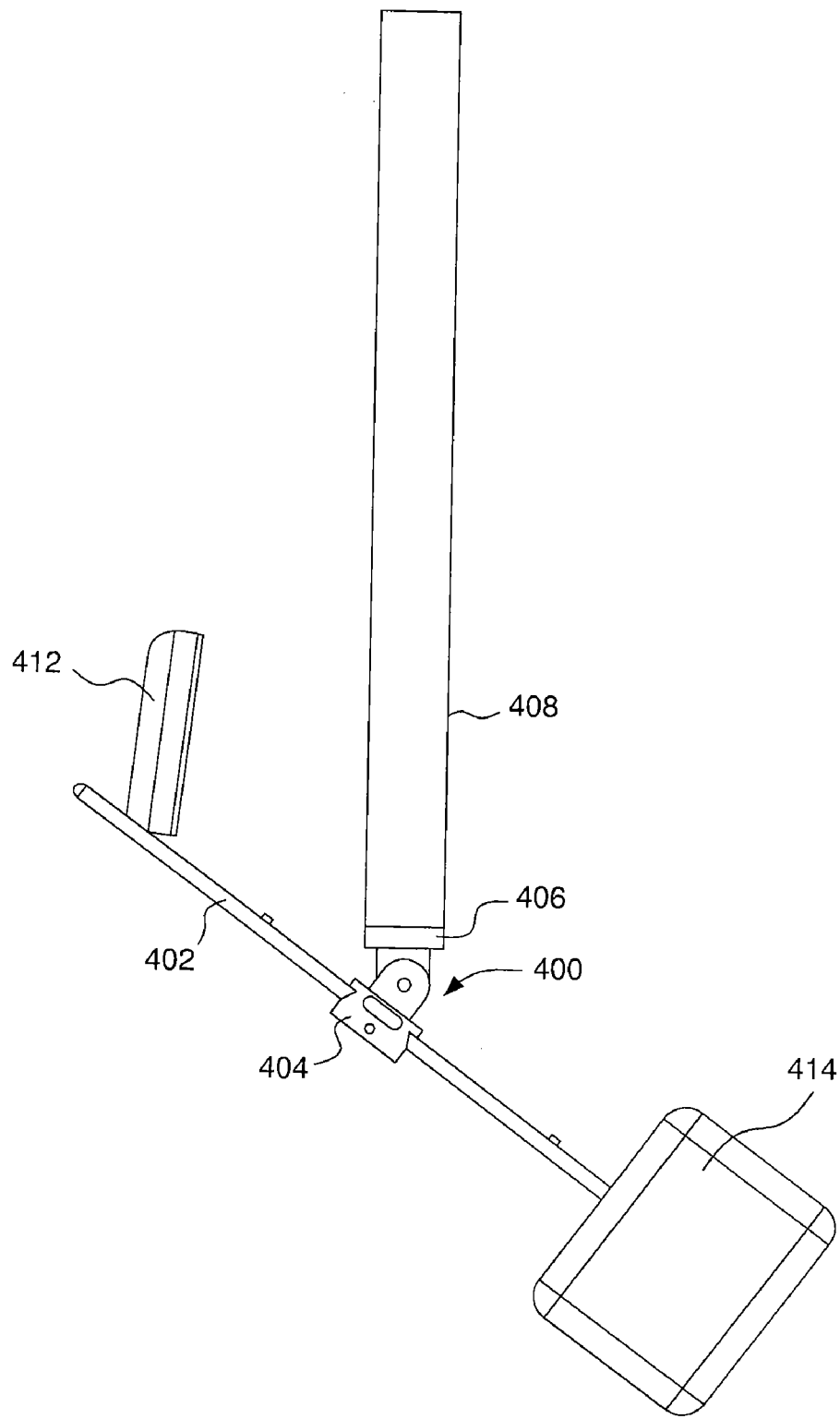
FIGS. 5A-B depict use of a folding hinge to balance equipment on a stabilizing system according to an illustrative embodiment of the invention.
Figure 5B:
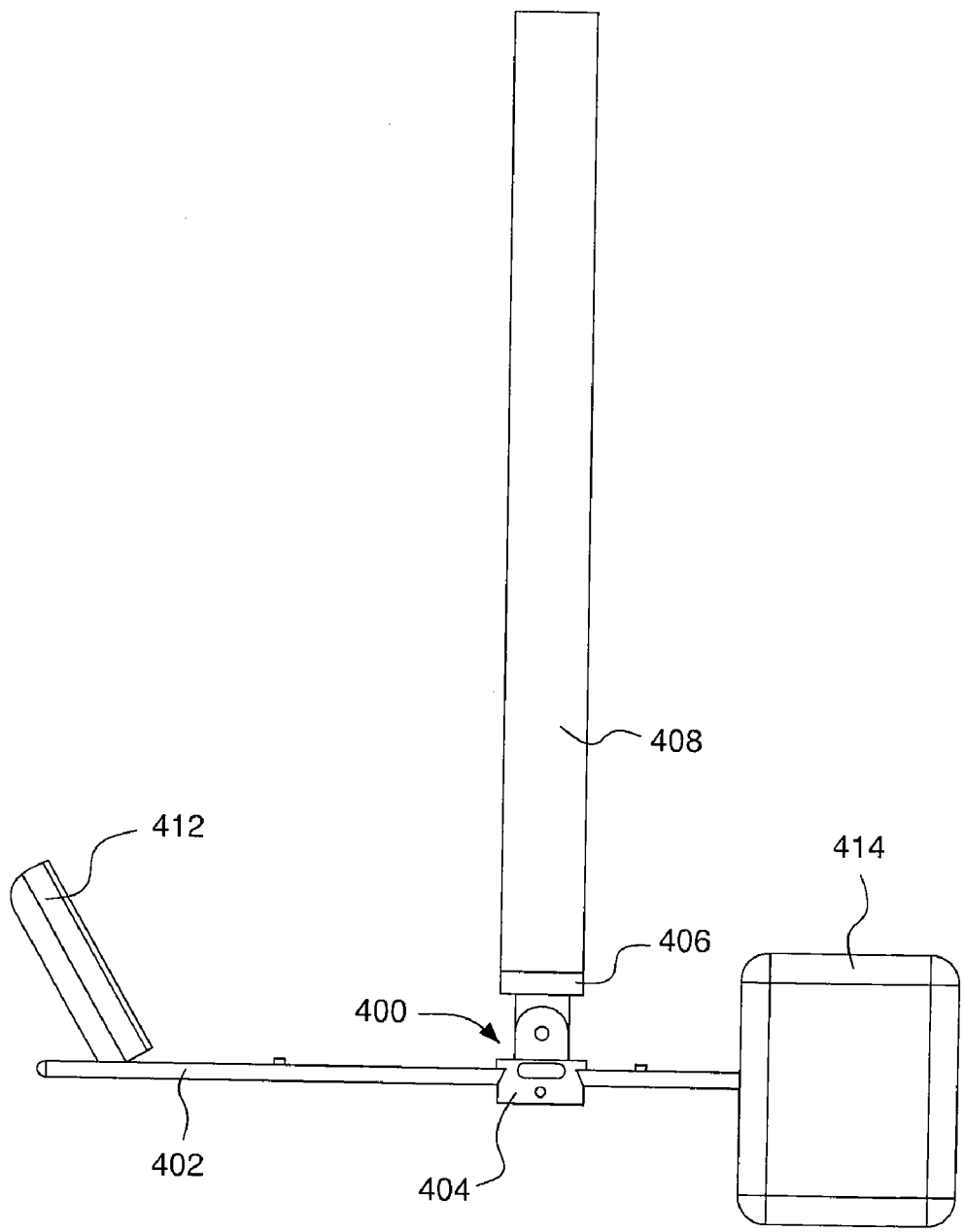

Embodiments of the invention provide various support members attached to a folding hinge. The attachment mechanism type between the support member and the folding hinge will depend in part on the design of the support member. FIG. 2C depicts a collar attachment, which is suitable, for example, to attaching a post to the hinge. FIGS. 4 and 5A-B depict a flat support member 402 slidably attached to a folding hinge 400 at a first support connector 404. (Although support member 402 is referred to as a "flat support member", it can be any cross-sectional shape compatible with the apparatus and hinge.) A second support connector 406 is attached to a post 408. Flat support member 402 is inserted through a slot 410. The particular embodiment shown provides a mechanism to adjust the position of flat support member 402 with respect to hinge 400. Flat support member 402 can be locked in place at various longitudinal points.

FIGS. 5A-B depict use of hinge 400 to balance equipment on a stabilizing system. Viewer or monitor 412 is balanced with respect to battery 414, and possible other equipment by sliding flat support member 402 through folding hinge 400. Folding hinge 400 can also be secured at a non-perpendicular angle to the horizontal, as depicted in FIG. 5A, for balancing and desirable positioning of the equipment. FIG. 5B shows another illustrative balancing/positioning configuration.

Figure 6:
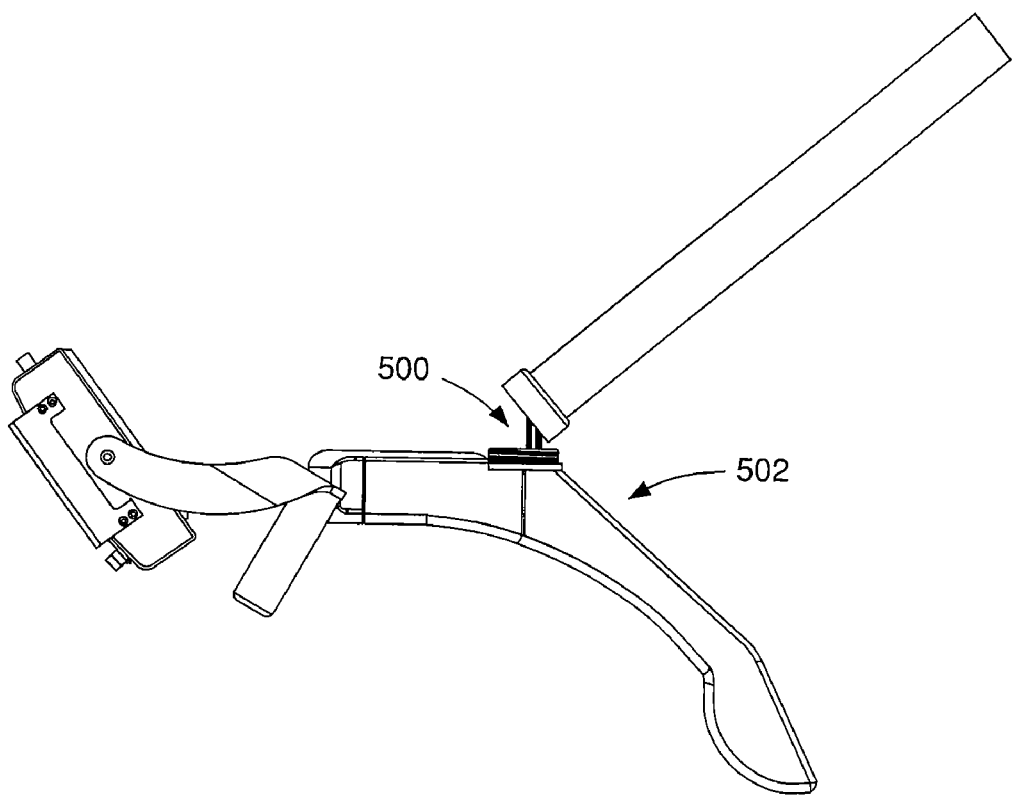
FIG. 6 depicts an illustrative example of a folding hinge mechanism mounted on a lower sled.

Other examples of connections that can be made with illustrative embodiments of folding hinges are between a camera mounting stage and post; gimbal and post; monitor mounting platform and support member; and between other equipment mounts and posts or support members. Balancing arms, such as seen in Steadicam® equipment can also be connected to stabilizing systems with embodiments of the folding hinge. Embodiments of the invention include these various support and mounting components, and the associated camera equipment. FIG. 6 depicts an illustrative example of a folding hinge mechanism 500 mounted on a lower sled portion 502.

Embodiments of the invention also include a method of connecting camera equipment on a support system using the inventive hinges as described herein. One or more hinges are provided to connect components of a stabilizing system. Cables are run through the hinge(s) and connected to the desired camera equipment. The hinge(s) are positioned at the desired angle, if adjustable in that manner, and secured in place, but pins, collars or the like. The stabilizing equipment can then be folded without affecting the adjustments and balancing of the system. Upon unfolding the system, the desired balancing and adjustments remain unaffected.

A variation on the hinge mechanism use a mechanically hinged mechanism that maintains electrical contact between the post and sled portions through a slip ring or wiper type connection system.

Illustrative embodiments of the invention include a lower portion of a cable or harness secured in place while an upper portion of the cable is allowed to pass freely through an opening in order to allow the hinge mechanism to operate. This in turn allows the cable(s) to move freely and not bind.

Top and bottom support connectors may be indexed together in the X and Y directions without the need for additional indexing components so as to maintain the rigidity required for correct operation and balance of the camera stabilization system.

While the invention has been described by illustrative embodiments, additional advantages and modifications will occur to those skilled in the art. Therefore, the invention in its broader aspects is not limited to specific details shown and described herein. Modifications, for example, to the application of the hinge to other system-types, may be made without departing from the spirit and scope of the invention. Accordingly, it is intended that the invention not be limited to the specific illustrative embodiments described herein, but be interpreted within the full spirit and scope of the appended claims and their equivalents.

What is claimed is:

1. A folding hinge for camera stabilization equipment comprising:
    a first support connector having one or more apertures therethrough;
    a second support connector having one or more apertures therethrough;
    an indexing guide having a first end connected to the first support connector and a second end connected to the second support connector, wherein the indexing guide pivotally connects the first support connector to the second support connector, and allows the first support connector and second support connector to slide apart from one another while remaining connected;
    the one or more first support connector apertures and the one or more second support connector apertures configured to allow one or more flexible components to pass through the first support connector one or more apertures and the second support connector one or more apertures;
    a locking collar releasably attached to the first support connector and second support connector and alignable with the support connectors to allow the one or more flexible components to pass through the locking collar, wherein the indexing guide is disposed within the locking collar when the locking collar is attached to both the first support connector and the second support connector.

2. The folding hinge of claim 1 further comprising an index locking mechanism to selectably lock the index guide in position with respect to the first and second support connectors.

3. The folding hinge of claim 2 wherein the index locking mechanism comprises:
    a first pivot locking component incorporated into the indexing guide having one or more lateral openings therethrough;
    a second pivot locking component rigidly attached to one of the first and second support connectors, and having one or more openings therethrough, wherein at least one of the one or more first pivot locking component lateral openings is alignable with two or more of the one or more second pivot locking component openings; and
    an indexing stop component selectably insertable through any one of the first and second pivot locking component openings to rigidly secure the position of the first support connector with respect to the second support connector.

4. The folding hinge of claim 1 further comprising:
    a first support member attachable to the first support connector; and
    a second support member attachable to the second support connector.

5. The folding hinge of claim 4 further comprising a camera mounting component attached to one of the first and second support members.

6. The folding hinge of claim 5 further comprising a camera.

7. The folding hinge of claim 1 further comprising:
    a monitor mounting support component attached to one of the first and second support connectors.

8. The folding hinge of claim 4 wherein one of the first or second support members is selectably and slidably attached to one of the first or second support connectors.

9. The folding hinge of claim 1 further comprising a battery support component attached to one or the first and second support connectors.

10. The folding hinge of claim 4 further comprising a gimbal assembly attached to one of the first and second support members.

11. The folding hinge of claim 1 further comprising one or more electrical contacts on at least one of the first and second support connectors.

12. A method of connecting camera equipment on a support system comprising:
    providing a hinge comprising a first support connector having one or more apertures therethrough;
    a second support connector having one or more apertures therethrough;
    an indexing guide having a first end connected to the first support connector and a second end connected to the second support connector, wherein the indexing guide pivotally connects the first support connector to the second support connector, and allows the first support connector and second support connector to slide apart from one another while remaining connected;
    the one or more first support connector apertures and the one or more second support connector apertures configured to allow one or more flexible components to pass through the first support connector one or more apertures and the second support connector one or more apertures;
    a locking collar releasably attached to the first support connector and second support connector and alignable with the support connectors to allow the one or more flexible components to pass through the locking collar, wherein the indexing guide is disposed within the locking collar when the locking collar is attached to both the first support connector and the second support connector;
    attaching a first support member to the first support connector;
    attaching a second support member to the second support connector;

functionally connecting a camera to one or more auxiliary camera components by attaching a flexible cable to the camera, passing the flexible cable through one of the one or more first support connector apertures and one of the one or more second support connector apertures;

attaching the flexible cable to at least one of the one or more auxiliary camera components; and connecting the locking collar to the first and second support connector.

13. The method of claim 12 further comprising:

providing an index locking mechanism to lock the index guide in position with respect to the first and second support connectors;

positioning the first support connector and the second support connector with respect to one another; and locking the supports connectors in the position with the index guide locking mechanism.

* * * * *